Feb. 7, 1939. H. S. JANDUS ET AL 2,146,121
BRAKE LEVER RELEASE MECHANISM
Filed May 10, 1937 2 Sheets-Sheet 1
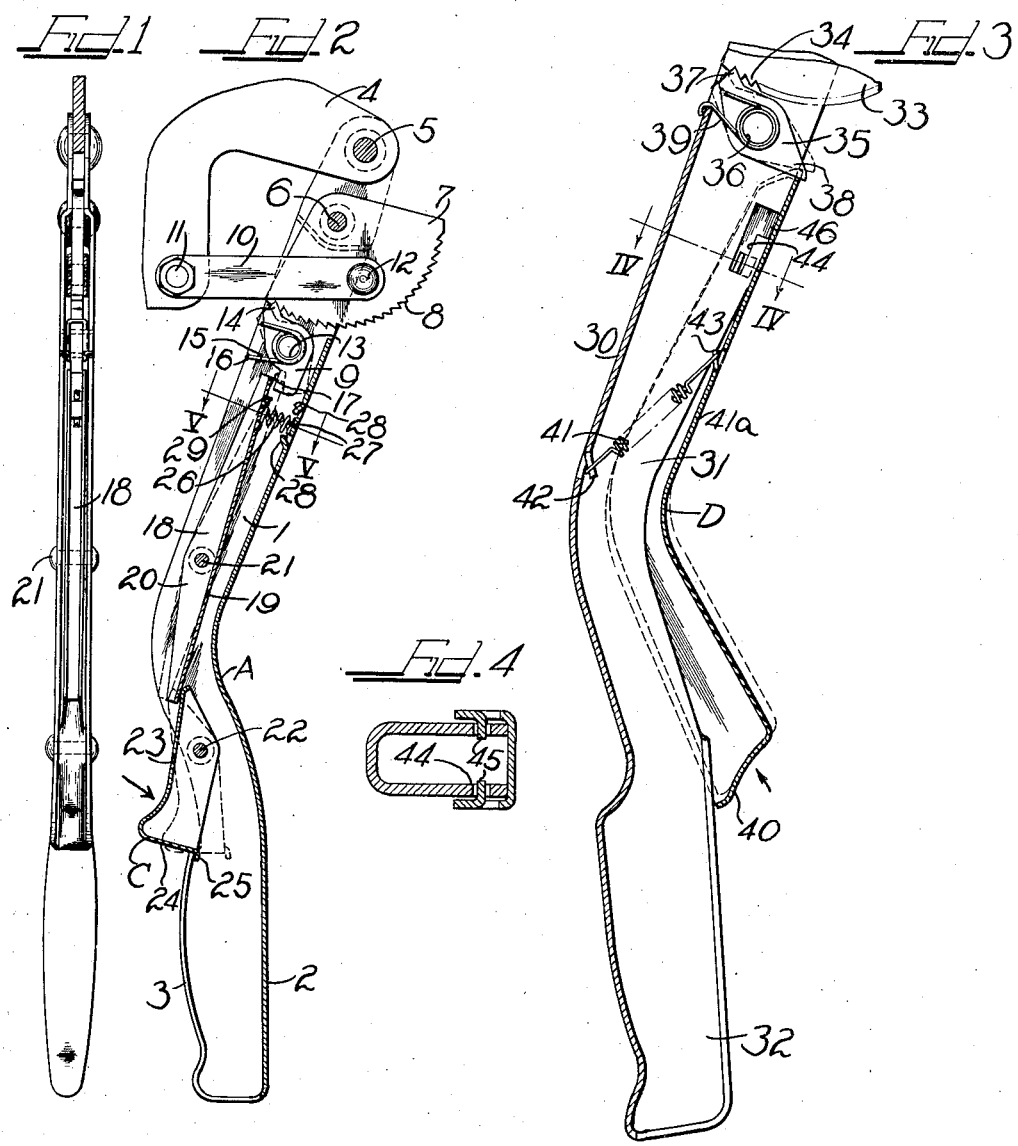
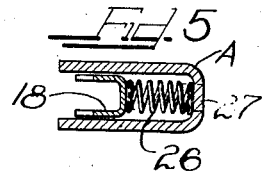
Inventors
HERBERT S. JANDUS
CHARLES F. PURDY

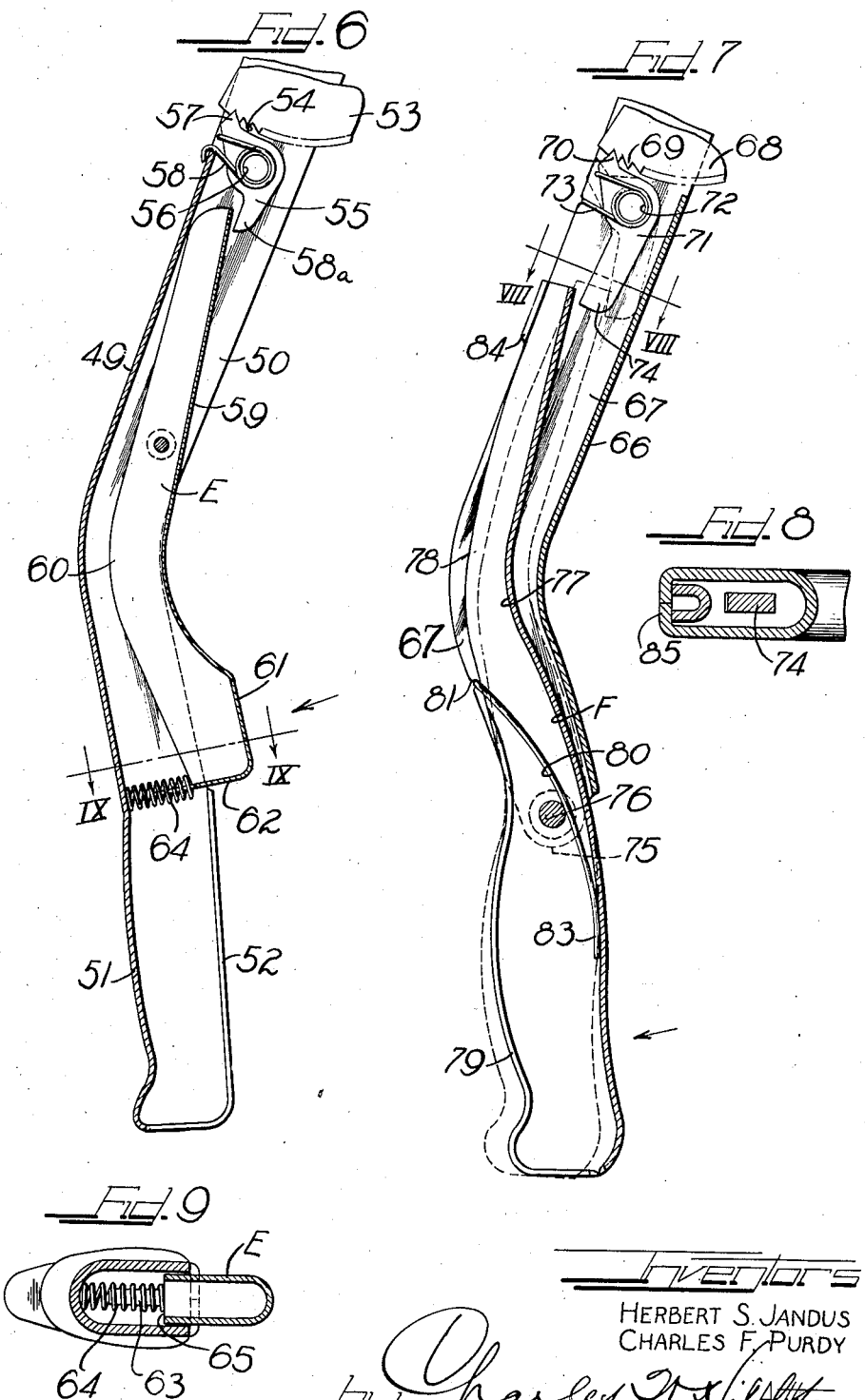

Patented Feb. 7, 1939

2,146,121

UNITED STATES PATENT OFFICE 2,146,121

BRAKE LEVER RELEASE MECHANISM

Herbert S. Jandus and Charles F. Purdy, Detroit, Mich., assignors, by mesne assignments, to Houdaille-Hershey Corporation, Detroit, Mich., a corporation of Michigan Application May 10, 1937, Serial No. 141,749

17 Claims. (Cl. 74—537)

This invention relates to novel release means for emergency brake levers for use in automotive vehicles.

The present invention is concerned with a construction of brake levers for automotive vehicles, which levers are constructed as stampings, and so designed and arranged as to be manufactured on a production basis and to sell at competitive prices.

An object of the present invention is to provide a brake lever construction of such character that the levers may be readily manufactured on a production basis, and in which the parts are constructed to be readily assembled at minimum expenditure for labor.

Another object of the present invention is to provide novel clutch release mechanisms for emergency brake levers for automotive vehicles.

A further object of the present invention is to provide an emergency brake lever construction wherein the parts are so arranged that the lever may be moved in brake setting direction without any movement being imparted to the clutch release member of the brake.

A still further object of the present invention is to provide an emergency brake lever construction for automotive vehicles, wherein the lever is declutched from adjusted position by a digit of one hand of the vehicle operator.

A still further object of the present invention is to provide a brake lever construction wherein the brake lever is declutched by a push action applied against a release member, which member is normally spaced from and disconnected from the lever carried portion of the clutch mechanism.

The invention has for a further object the provision of a brake lever construction for automotive vehicles, wherein the lever may be released from adjusted position by pressure applied to the release member by a finger or thumb of the vehicle operator.

The above, other, and further objects of the present invention will be apparent from the following description and accompanying drawings.

The accompanying drawings illustrate embodiments of the present invention, and the views thereof are as follows:

Figure 1 is an elevational view of a brake lever constructed in accordance with one form of the present invention.

Figure 2 is a view, partially in elevation and partially in longitudinal section, of the lever of Figure 1, showing the relationship of the parts when the lever is in "off" position.

Figure 3 is a fragmental view, partially in elevation and partially in longitudinal section, of another form of lever construction of the present invention.

Figure 4 is a transverse sectional view taken substantially in the plane indicated by line IV—IV of Figure 3.

Figure 5 is an enlarged transverse sectional view taken substantially in the plane indicated by line V—V of Figure 2.

Figure 6 is a view, partially in elevation and partially in longitudinal section, of a still further form of the present invention.

Figure 7 is a similar view of yet another form of the invention.

Figure 8 is a transverse sectional view taken substantially in the plane indicated by line VIII—VIII of Figure 7.

Figure 9 is a transverse sectional view taken substantially in the plane indicated by line IX—IX of Figure 6.

The drawings will now be explained.

The lever illustrated in Figures 1 and 2 comprises a lever member A, fashioned by stamping, from flat metal stock, formed with a channel-shaped shank 1 and a closed grip portion 2, which is hollow. The finger or pressure side 3 of the grip is formed by bringing over the margins of the side walls of the lever, during the stamping operations, to close the grip portion and thus afford a handle that is smooth and comfortable to the operator's hand. As illustrated, the grip portion is offset with respect to the shank portion in order readily to adapt the lever to an automotive vehicle, with a pivotal connection of the lever behind the instrument board, and with the lever depending from its pivotal connection, presenting the grip portion below the lower margin of the instrument board, as is the practice in arranging the dash type of brake levers.

At one end, the lever A is pivoted to a fixed support 4, the drawings showing the lever pivoted at its upper end to the support by means of a suitable pivot pin 5. Pivoted to the lever a short distance from the lever pivot 5, as at 6, is a rockable plate or ratchet sector 7 having ratchet teeth 8 on an arcuate margin, in position to make latching or clutching engagement with a pawl 9 pivoted to the lever. The plate 7 is shown as rockable about its pivot 6 by means of links 10, which are connected at similar ends, as at 11, to the support 4, and at opposite ends, as at 12, to the plate, thus rocking the plate about its pivot 6 as the lever is swung in use. The pawl 9 is pivoted to the lever by means of a tubular pivot 13, and is provided with a point 14 which enters any one of the teeth 8 of the ratchet to latch or clutch the lever in adjusted position. For maintaining the pawl 9 in engagement with the ratchet, a spring 15 is utilized. This spring is shown as being formed of wire, with a portion bent about the pawl pivot 13, one part of the spring secured to the lever by engagement with a notch 16 in the lever, and bearing against the pawl adjacent its point 14. Of course, any other suitable spring may be substituted for this spring, to urge the pawl into latching or clutching engagement with its ratchet. The pawl 9 is provided with a part constituting a shoulder 17.

A rockable bar 18, shown as formed as a stamping with a web 19 and side walls 20, is pivotally connected at 21, between its ends, to the shank portion of the lever A, and is illustrated as lying arranged with its web 19 disposed near the web of the shank portion of the lever and its side walls 20 extending away from the web of the lever. This bar 18 is so arranged within the shank portion of the lever that an end thereof is disposed to make contact with the shoulder 17 of the pawl under certain conditions.

A trigger C, which is stamped to form a shoe-like member, is pivoted at 22 to the walls of the lever, and arranged with its web 23 against the web 19 of the bar 18. The trigger C has its lower end closed as at 24, and a stop 25 formed on its lower end to engage the margin of the surface 3 of the grip portion of the lever as a stop to prevent outward movement of the lower end of the trigger beyond a fixed point.

The trigger C works within the space between the walls of the lever, adjacent the grip portion of the lever, and near the inner end of such grip portion. By inner end is meant that portion of the grip which is remote from the free end, in the present instance, of the lever, and as illustrated, this would be the upper end of the grip portion of the lever.

In order to maintain the trigger member C projected, as shown in full lines in Figure 2, and the end of the bar 18 which is adjacent the shoulder 17 spaced from the pawl, a spring 26 is utilized and arranged as bearing against the end of the bar adjacent the pawl. The spring 26 at one end rests against the web of the shank portion of the lever, as at 27, and at its other end bears against a portion of the web of the bar 18. To prevent displacement of the end of the spring which is against the lever, lugs 28 are struck inwardly from the web of the shank, on opposite sides of the spring, to prevent accidental removal of the spring. In like manner, lugs 29 are struck out of the web of the bar 18 to guide the other end of the spring. The lugs 28 and 29 thus maintain the spring 26 in operative relation between the shank portion of the lever and the bar 18, and constitute an inexpensive manner of spring mounting.

The spring 26, in addition to normally maintaining the adjacent end of the bar 18 in spaced relation with respect to the shoulder 17 of the pawl, maintains the trigger C in projected position as shown in full lines in Figure 2, ready to be actuated by a finger of the vehicle operator.

The space between the shoulder 17 of the pawl and the adjacent end of the bar 18 is such that as the lever is swung from "off" position to "set" position, which would be a movement in counter-clockwise direction as viewed in Figure 2, the pawl may bounce along the ratchet teeth 8 without in any manner imparting movement to the trigger C.

The relationship of the parts is such that but a slight pull on the trigger C to move it from full line to dotted line position of Figure 2 suffices to rock the bar 18 sufficiently to unlatch the pawl from its ratchet, thereby enabling movement of the lever towards "off" position.

The lever of Figure 3 is fashioned, by stamping or like operations, from flat metal, to provide a channel-shaped shank portion 30 and side walls 31, and a closed hollow grip portion 32 at the free end of the lever. Figure 3 shows this form of the lever in "off" position. To move the lever to set the brakes, the lever will be swung in counter-clockwise direction about its pivot in the same manner as the lever described with reference to Figures 1 and 2.

Inasmuch as the pivoted end construction of the lever is immaterial, it is not shown in the lever of Figure 3.

A rockable ratchet sector 33 is pivoted to the lever in the same manner as is the plate 7 of Figure 2, and rocking movement is imparted to the sector as the lever is swung. This sector is provided with the ratchet teeth 34.

A pawl 35 is pivoted to the lever by means of a hollow or tubular pivot 36, with the pawl provided with a tooth or part 37 for making latching engagement with any of the teeth of the ratchet. The pawl has a tail portion 38 which is shown as projecting a slight distance outwardly of the shank portion of the lever, adjacent the sector 33. A spring 39 is utilized normally to maintain the pawl in latched or clutched engagement with its ratchet.

A release member for unlatching the pawl from its sector 33 is herein illustrated as comprising a member D, which is stamped from flat metal to provide a member substantially channel-shaped throughout the major portion of its length, and with one end closed, as at 40, to provide a surface for engagement by a thumb of the operator. The end 40 of the member D is disposed at the inner end of the grip portion of the lever in such position as may be readily pressed by the thumb of the hand of the operator which grasps the grip portion of the lever to actuate the lever. The member D has a web 41a and side walls, and is assembled with respect to the shank portion of the lever with the side walls of the lever and member D in over-lapped relation. The end of the web portion of the member D, adjacent the pawl, lies along the margins of the side walls of the lever as thumb pressure is applied, in one direction, against the end 40 of the member. Retrograde movement of the member D is caused by a spring 41 connected at one end to a lug 42 formed in the lever and at the other end to a lug 43 formed in the member D.

Means are provided for maintaining the member D against displacement with respect to the lever by allowing endwise movement of this member to unlatch the pawl. The means illustrated for accomplishing this purpose comprise bayonet notches or slots 44, which are L-shaped in elevation, cut in the opposing side walls of the shank portion of the lever, adjacent the pawl, and lugs 45, struck inwardly from the side walls of the member D and entered in the slots 44. The bayonet slots 44 have entrances, designated as 46 in Figure 3, whereby the lugs 45 may be inserted in the slots 44. The slots 44 extend lengthwise of the shank portion of the lever, and the action of the spring 41 is such as, under normal conditions of operation to maintain the lugs 45 within the longitudinal portions of the slots 44.

The margin of the end 40 rides on the palm portion of the grip of the lever as the actuating member D is reciprocated in use. The full line position of the member D in Figure 3 shows its normal or retracted position, and the dotted line position shows it in its advanced position, which is that to which it is moved to unlatch the pawl from its cooperating latched engagement with the ratchet. With the member D in normal or retracted position, the end thereof adjacent the pawl is spaced from the tail 35 of the pawl a sufficient distance to permit the pawl to rock about its pivot as the lever is swung from "off" position to "set" position, without imparting any movement whatsoever to the member D.

In the operation of this form of the invention, the lever is moved to set position by the operator grasping the pressure or finger side of the lever and swinging the lever in counterclockwise direction, without necessarily having to shift the member D. During such movement, the point 37 of the pawl rides over the ratchet teeth, with bouncing or oscillating action, until the lever is at rest, whereupon the spring 39 causes latching engagement of the pawl with the nearest tooth of the ratchet. To release the lever from its set position, the operator applies his thumb against the end 40 of the member D and pushes against the member, whereupon the end of the member adjacent the pawl moves against the tail of the pawl and unlatches the pawl from its ratchet, whereupon, with the member D still advanced, the lever is moved in clockwise direction to off position.

The form of the invention illustrated in Figure 6 includes a stamped lever having a shank portion of channel shape with a web 49 and side walls 50. The grip portion has a finger or pressure side 51 formed as a continuation of the web 49 of the shank, and a palm portion 52 formed by bringing the margins of the walls together in closed relationship. The finger side 51 of the grip may be curved longitudinally to afford a comfortable grip portion for the hand of the operator.

A rockable ratchet plate 53, having ratchet teeth 54 thereon, is pivoted to the lever in the manner described with reference to Figure 2, and a pawl 55 is pivoted to the lever by means of a hollow pivot 56. The pawl has a tooth 57 for making latching engagement with any of the teeth of the ratchet 54 to latch the lever in adjusted position. A spring 58 functions to maintain the tooth 57 of the pawl in latched engagement with the ratchet. The pawl has a tailpiece 58ª formed integrally with it.

A rocking bar E, fashioned from stamped metal and providing a web 59 and side walls 60, is arranged to work within the channel-shaped shank of the lever with its web in opposition to the web 49 of the lever and with its side walls 60 and the walls 50 of the lever in overlapped relation. The bar E, at its end adjacent the grip portion of the lever, has an outstanding part forming a pressure surface 61, and an end 62. The surface 61 is adapted to be pressed against by the thumb of the hand of the vehicle operator who grasps the lever to move it. In this form of construction, the member E is shown as provided with a tongue 63 formed as an extension of the end 62 of the member, about which a spring 64 is coiled, of which one end bears against the web 49 of the lever, and the other end against the margins or shoulders 65 formed in the end 62 by the construction of the tongue 63. The spring 64 functions to maintain the end of the bar E which is adjacent the grip portion of the lever in outward position, and the end of the bar which is adjacent the pawl spaced from the tail of the pawl, so that the pawl may oscillate about its pivot when the lever is moved from "off" position to "set" position, without imparting any movement to the member E.

To unlatch the pawl of the form of lever shown in Figure 6, the operator grasps the grip portion of the lever with his fingers and applies his thumb against the surface 61 of the member E, pressing this surface inwardly, which swings the other end of the bar E against the tail of the pawl to unlatch the pawl from its ratchet, thus allowing retrograde movement of the lever.

While the spring 64 in the lever of Figure 6 is shown as acting against the end of the bar E which is adjacent the grip portion of the lever, it is to be understood that this spring might be replaced by one applied against the web portion of the bar E adjacent the pawl end of the bar, somewhat like the spring shown in the lever of Figure 2.

The form of lever illustrated in Figure 7 shows a lever having a channel-shaped shank portion providing a web 66 and side walls 67. A rockable ratchet sector 68 is pivoted to the lever, and is provided with ratchet teeth 69 which engage the tooth 70 of a pawl 71 pivoted to the lever by means of a tubular or hollow pivot 72. A spring 73 engages the pawl normally to retain it in latched engagement with the ratchet.

In this form of the invention, the pawl 71 is provided with an elongated tail piece 74 which extends generally in the direction of the length of the shank portion of the lever away from the pawl pivot.

The lever, in this form of the invention, is not provided with a grip portion, but at its free end terminates in ears 75 which are apertured to receive a pivot pin 76.

A combined rocking bar and grip member F is fashioned from flat metal by suitable stamping or similar operations, to provide a channel-shaped portion having a web 77 and side walls 78, and a hollow grip portion 79. The member F is pivoted to the lever by means of the pin 76, with the channel-shaped portion of this member within the channel-shaped portion of the lever, and with the tubular grip portion of the member projecting beyond the adjacent extremity of the lever. The channel-shaped portion of this member terminates adjacent the end of the tail 74 of the pawl 71 and is disposed so that its web contacts the pawl tail when the grip portion 79 is rocked in clockwise direction as viewed in Figure 7 about its pivot 76.

For normally maintaining this end of the member F in spaced relation to the tail 74 of the pawl, a spring 80 is employed. This spring is shown as formed of wire, with a bight engaged in a notch 81 formed in the edges of the side walls 67 of the lever shank, and its free end 83 bearing against the interior of the grip portion 79 of the member in such fashion as to maintain that end of the member which is adjacent the pawl in spaced relation to the pawl tail. In order to limit the movement of this end of the member F, in a direction away from the pawl tail, a stop 84 of metal is welded or otherwise secured to the margins of the walls of the shank portion of the lever in position to be engaged by the walls 78 of the member F, as may be observed in Figure 7.

In this form of the invention, Figure 7 shows the parts in normal position, which is that occupied by the parts when the pawl is in latched engagement with the ratchet.

If it is desired to swing the lever from the position shown in Figure 7, which is the "off" position, to a "set" position, the operator grasps the handle portion 79 of the member F, against the left-hand surface thereof as viewed in Figure 7, and swings the lever in counterclockwise direction. During such movement, no relative movement occurs between the member F and the lever shank, as the member F abuts the stop 84 and is maintained in abutment therewith by reason of the spring 80.

When it is desired to unlatch the pawl, the operator presses against the handle portion 79 of the member F in a direction to oscillate it about the pin 76 in clockwise direction, which movement causes the end of the member F which is adjacent the pawl to move against the tail of the pawl and trip the pawl from latched engagement with its ratchet, whereupon the lever may be swung to "off" position.

The abutment herein mentioned as comprising a stop 84 welded or otherwise secured to the side walls of the lever shank may consist of ears 85 which are inturned, as shown in Figure 8. It might be said that this is a preferable manner of providing the abutment for the end of the member F which is adjacent the pawl.

In the forms of the invention herein illustrated and described, that member which normally engages the pawl to trip the pawl from latching engagement with its ratchet is normally maintained in spaced relation with respect to the pawl, so that as the lever is swung to set position, the pawl may bounce along its ratchet without imparting any motion to such actuating member, thereby reducing rattle to a minimum.

The fact that two springs are utilized, one for maintaining the pawl in latched engagement with its companion clutch member, and the other for maintaining the pawl actuating means in one position, makes it possible so to design the latter spring as effectively to maintain the actuating member in operative position without rattle, and without having to have a spring of such strength as to make it troublesome to actuate this member.

A brake lever constructed in accordance with the principles of the present invention may be economically manufactured, as the majority of parts are formed of stampings, and the construction is so simplified that the assembly of parts may be accomplished with a minimum expenditure for labor.

The invention has been described herein more or less precisely as to details, yet it is to be understood that the invention is not to be limited thereby, as changes may be made in the arrangement of proportions of parts, and equivalents may be substituted, without departing from the spirit and scope of the invention.

The invention is claimed as follows:

1. An automotive vehicle emergency brake lever construction including a rigid lever having pivotal connection at one end and a hand grip portion at the other end, clutch means for holding said lever in adjusted position, said clutch means including a clutch part carried by said lever, spring means for normally maintaining said clutch means engaged, a clutch release member carried by and movable on said lever and having a part engageable with said clutch part when said member is moved in one direction, and spring means normally holding said member part spaced from said clutch part to prevent rattle and to permit movement of the lever in one direction without causing movement of the clutch release member, and said clutch release member being movable in releasing direction when a force is applied to it adjacent the inner end of said hand grip portion and by movement of said member relatively to said grip portion.

2. A brake lever construction including a stamping forming a lever having a channel-shaped shank and a tubular grip portion, a pawl pivoted to said lever for cooperating with a ratchet to clutch the lever in adjusted position, a spring engaging said pawl to normally maintain it in clutched position, a pawl release member of stamped metal movably supported on said lever and having a part for contacting said pawl, spring means for normally maintaining said part out of contact with said pawl, and digitally operable means for moving said release member to unclutch said pawl.

3. A brake lever comprising a stamping forming a lever having a channel-shaped shank and a tubular grip portion, a pawl pivoted to said lever for cooperating with a ratchet to clutch the lever in adjusted position, a spring engaging said pawl to normally maintain it in clutched engagement, a pawl release member of stamped metal movably mounted on said lever and having a part for contacting said pawl working within the lever shank, spring means for normally maintaining said pawl release member in one position, and digitally operable means for moving said release member to unclutch said pawl, the parts being so arranged that the portions of the pawl and pawl release member which are in engagement when the member is operated to unclutch the pawl are normally spaced to permit movement of the pawl along the ratchet as the lever is moved in brake setting direction without causing any movement of said release member.

4. In a brake lever of the pawl and ratchet type, a pawl release member movable by a substantially endwise push action to unlatch the pawl from its ratchet, and spring means for normally maintaining said release member spaced from said pawl.

5. In a brake lever of the pawl and ratchet type, a spring for normally maintaining said pawl and ratchet in latched engagement, a pawl release member movable by a substantially endwise push action to unlatch the pawl from the ratchet, and spring means for normally maintaining said release member spaced from said pawl.

6. A brake lever construction including a stamped lever having a channel-shaped shank, a release member of stamped metal pivoted to said shank walls with its web along the web of the shank and its side walls projecting away from the shank web, a pawl pivoted to said lever and having a tail lying in the path of movement of the adjacent end of said release member, a spring for urging said pawl in one direction, spring means for normally maintaining the adjacent end of said release member spaced from said pawl tail, and a channel-shaped trigger pivoted to said lever approximately at the inner end of the lever grip and arranged with a part of its web against the web of the other end of said release member and having a part exposed for finger engagement.

7. A brake lever construction including a stamped lever having a channel-shaped shank, a release member of stamped metal pivoted to said shank walls with its web along the web of the shank and its side walls projecting away from the shank web, a pawl pivoted to said lever and having a tail lying in the path of movement of the adjacent end of said release member, a spring for urging said pawl in one direction, spring means for normally maintaining the adjacent end of said release member spaced from said pawl tail, and a channel-shaped trigger pivoted to said lever approximately at the inner end of the lever grip and arranged with a part of its web against the web of the other end of said release member and having a part exposed for finger engagement, said trigger working through the pressure side of the lever grip and operable by a finger of the operator to rock said release member to trip the pawl.

8. A brake lever construction including a stamped lever having a channel-shaped shank, a release member of stamped metal pivoted to said shank walls with its web along the web of the shank and its side walls projecting away from the shank web, a pawl pivoted to said lever and having a tail lying in the path of movement of the adjacent end of said release member, a spring for urging said pawl in one direction, spring means for normally maintaining the adjacent end of said release member spaced from said pawl tail, and a channel-shaped trigger pivoted to said lever approximately at the inner end of the lever grip and arranged with a part of its web against the web of the other end of said release member and having a part exposed for finger engagement, said trigger having a part for hooking engagement with the lever to limit movement of said trigger in one direction.

9. A brake lever construction including a stamped lever having a U-shaped shank and a tubular grip at its free end, a pawl pivoted to said lever for engaging a ratchet, a spring for urging said pawl in one direction, a pawl release member of stamped metal and of substantially U shape in cross section, having a portion movable within the lever shank and with the webs of said shank and member in opposed relationship and the walls thereof overlapped, said lever and release member having cooperating means for guiding said member, spring means between said lever and member for maintaining said pawl and adjacent end of the member in spaced relation, and said release member having an end disposed adjacent the lever grip engageable by a thumb of the operator for moving said member by thumb pressure to release the pawl.

10. An emergency brake lever for automotive vehicles comprising a stamping having a U-shaped shank and a tubular grip at its free end, a pawl pivoted to said lever for latching engagement with a ratchet, a spring for maintaining said pawl in one position, a stamped U-shaped pawl release member having portions movable within the lever shank and with the webs of the member and shank in opposition and the side walls thereof overlapped, said lever and member being connected for relative pivotal movement, said pawl and said release member having engageable parts, spring means for normally maintaining said engageable parts in spaced relation, and said member having an end adjacent the lever grip providing a surface for engagement by a thumb of the operator whereby said member may be rocked by thumb pressure to unlatch the pawl.

11. A brake lever construction including a stamping comprising a U-shaped body portion and parallel legs for pivotal connection to a support, a pawl pivoted to said lever and arranged for cooperation with a ratchet to hold the lever in adjusted position, said pawl having a tail lying along said lever body, a combined handle and pawl release member stamped to provide a closed handle grip portion and a U-shaped extension, said member being pivoted to said lever body at its end remote from the lever pivot with said extension lying within the U-shaped body of the lever with an end adjacent said pawl tail, said lever having an abutment for the said end of said extension, and a spring fulcrumed on the pivotal connection of the lever body and said member and having hooked engagement with said lever body for normally maintaining said end of said extension against said abutment and spaced from said pawl tail.

12. A brake lever construction including a stamping comprising a U-shaped body portion and parallel legs for pivotal connection to a support, a pawl pivoted to said lever and arranged for cooperation with a ratchet to hold the lever in adjusted position, said pawl having a tail lying along said lever body, a combined handle and pawl release member stamped to provide a closed handle grip portion and a U-shaped extension, said member being pivoted to said lever body at its end remote from the lever pivot with said extension lying within the U-shaped body of the lever with an end adjacent said pawl tail, said lever having an abutment for the said end of said extension, and a spring fulcrumed on the pivotal connection of the lever body and said member and having hooked engagement with said lever body for normally maintaining said end of said extension against said abutment and spaced from said pawl tail, said abutment and the pivotal connection of said member and lever body coacting to prevent relative rocking movement of said member and said lever body when said lever is swung to set position.

13. An automotive vehicle emergency brake lever construction including a rigid lever having pivotal connection at one end and a hand grip portion at the other end, clutch means for holding said lever in adjusted position, said clutch means including a clutch part carried by said lever, spring means for normally maintaining said clutch means engaged, an elongated clutch release member extending along said lever and thereto pivoted and having an end engageable with said clutch part, spring means acting against said release member to normally maintain said member end spaced from said clutch part to prevent rattle, and said clutch release member being rockable in releasing direction by digital action applied to it adjacent the inner end of said hand grip portion.

14. A control lever construction including a rigid lever member having pivotal connection at one end and a hand grip portion at the other end, clutch means for holding said lever in adjusted position, said clutch means including a clutch part carried by said lever member, spring means for normally maintaining said clutch means engaged, an elongated clutch release member extending along said lever member and thereon shiftably supported and having an end engageable with said clutch part, spring means acting against said release member to normally maintain said end spaced from said clutch part to prevent rattle, and means responsive to digital action applied near the inner end of said hand grip portion for shifting said clutch release member as to move said end thereof into engagement with said clutch part to release the engagement of said clutch means.

15. An automotive vehicle emergency brake lever construction including a rigid lever having a pivotal connection at one end, a toothed sector carried by said lever near said one end, a pawl pivoted on said lever to engage said sector for holding said lever in adjusted position spring means for normally maintaining said pawl in engagement with said sector, and an elongated pawl release member extending along said lever and supported thereby, the said release member being adapted, at the other end of the lever, for manipulation by the driver of the vehicle to effect disengagement of said pawl from said sector, said release member having an end engageable with said pawl, and spring means acting against said release member to normally maintain said member end in disengaged relation with said pawl.

16. An automotive vehicle emergency brake lever construction including a rigid lever having pivotal connection at one end and having a hand grip portion at the other end provided with means defining a slot at its inner end, clutch means carried by said lever for holding said lever in adjusted position, said clutch means including a pawl and a sector carried by said lever, spring means for normally maintaining said clutch means engaged, a pawl release member carried by and movable on said lever and having a part engageable with said pawl sector part when said member is moved in one direction, spring means normally holding said member spaced apart from said pawl to prevent rattle and to permit movement of the lever in one direction without causing movement of the pawl release member, and a finger operable member supported on said lever and having a portion extending outwardly through the slot in said hand grip portion and arranged movable to actuate said pawl release member.

17. An emergency brake lever construction for the dash of automotive vehicles, said construction comprising a support, a stamping forming a slotted lever shank of U-shaped cross-section, said lever having spaced legs at its upper end disposed astraddle said support and pivoted thereto, and having a closed grip portion at its lower end, a trigger pivoted in said slot and arranged for manipulation by the forefinger of the hand of the driver of the vehicle, said trigger being disposed with a portion thereof normally projecting outwardly of the slot adjacent the upper end of said grip portion, spring means normally maintaining said trigger in its projected position, cooperating clutching members for holding said lever in adjusted position, with at least one of said clutching members being pivoted to said shank, and a member working within the shank slot cooperable with said trigger and with said one clutching member to move said clutching member to unclutched position and release said lever when said trigger is rocked into said slot.

HERBERT S. JANDUS.
CHARLES F. PURDY.